United States Patent
Dijamco et al.

(10) Patent No.: US 11,914,627 B1
(45) Date of Patent: *Feb. 27, 2024

(54) PARSING NATURAL LANGUAGE QUERIES WITHOUT RETRAINING

(71) Applicant: GOOGLE LLC, Mountain View, CA (US)

(72) Inventors: Armand Joseph Dijamco, San Francisco, CA (US); Tolga Bozkaya, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,040

(22) Filed: Apr. 11, 2022

Related U.S. Application Data (63) Continuation of application No. 15/265,524, filed on Sep. 14, 2016, now Pat. No. 11,301,502.

(60) Provisional application No. 62/218,796, filed on Sep. 15, 2015.

(51) Int. Cl.
*G06F 7/00* (2006.01)
*G06F 16/00* (2019.01)
*G06F 16/33* (2019.01)
*G06F 9/451* (2018.01)
*G06F 16/338* (2019.01)

(52) U.S. Cl.
CPC ........ *G06F 16/3344* (2019.01); *G06F 9/451* (2018.02); *G06F 16/334* (2019.01); *G06F 16/338* (2019.01)

(58) Field of Classification Search
None
See application file for complete search history.

(56) References Cited

U.S. PATENT DOCUMENTS

| | | |
|---|---|---|
| 5,873,075 A | 2/1999 | Cochrane et al. |
| 5,890,103 A | 3/1999 | Carus |
| 6,236,959 B1 | 5/2001 | Weise |
| 6,665,640 B1 | 12/2003 | Bennett et al. |
| 7,027,974 B1 * | 4/2006 | Busch ............... G06F 40/253 704/4 |
| 7,263,517 B2 | 8/2007 | Sheu et al. |
| 2002/0128821 A1 | 9/2002 | Ehsani et al. |
| 2005/0080795 A1 | 4/2005 | Kapur et al. |
| 2005/0262056 A1 | 11/2005 | Hamzy et al. |

(Continued)

*Primary Examiner* — Tuan A Pham
(74) *Attorney, Agent, or Firm* — Gray Ice Higdon (57) ABSTRACT

Methods, systems, and apparatus, including computer programs encoded on computer storage media, for disambiguating join paths for natural language queries. One of the methods includes, obtaining a natural language query from a user; parsing the natural language query into structured operations to be performed on APIs of a knowledge base, including: responsive to detecting a parsing ambiguity in which the natural language query can be parsed in two or more ways: providing, through a user interface, to the user one or more information items identifying the parsing ambiguity; responsive to a user interaction with an information item: modifying the parsing in accordance with the user interaction to generate one or more structured operations; performing the one or more structured operations on the structured APIs of the knowledge base to determine one or more search results; and providing one or more search results to the user.

14 Claims, 4 Drawing Sheets

(56) References Cited

U.S. PATENT DOCUMENTS

| | | |
|---|---|---|
| 2006/0074980 A1 | 4/2006 | Sarkar |
| 2007/0106499 A1 | 5/2007 | Dahlgren et al. |
| 2011/0320187 A1 | 12/2011 | Motik et al. |
| 2015/0186504 A1* | 7/2015 | Gorman ................. G06F 40/30 707/752 |
| 2015/0379013 A1* | 12/2015 | Purcell ................ G06F 16/3329 707/755 |

* cited by examiner

PARSING NATURAL LANGUAGE QUERIES WITHOUT RETRAINING

BACKGROUND

This specification relates to parsing natural language queries.

A gap can exist between a quality of an output provided by a conventional natural language parser and a quality of a parsed input required by applications that have a low tolerance for misinterpretation.

Parsing quality can typically be increased by improving how a parser is trained or retrained, as well as providing high quality parser training data, both of which, however, can be resource- and time-consuming.

SUMMARY

In general, this specification describes technologies for enhancing parsing quality without retraining. In general, one innovative aspect of the subject matter described in this specification can be embodied in methods that include the actions of obtaining a natural language query from a user; parsing the natural language query into structured operations to be performed on APIs of a knowledge base, including: responsive to detecting a parsing ambiguity in which the natural language query can be parsed in two or more ways: providing, through a user interface, to the user one or more information items identifying the parsing ambiguity; responsive to a user interaction with an information item: modifying the parsing in accordance with the user interaction to generate one or more structured operations; performing the one or more structured operations on the structured APIs of the knowledge base to determine one or more search results; and providing one or more search results to the user.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The knowledge base and the user interface are implemented on one or more computers and one or more storage devices storing instructions; and wherein the knowledge base stores information associated with entities according to a data schema and includes the structured APIs for programs to query the knowledge base. Applying the change to the natural language query comprises: adding one or more words to the natural language query. Applying the change to the natural language query comprises: adding one or more symbols to the natural language query. Applying the change to the natural language query comprises: changing syntax of the natural language query. Changing syntax of the natural language query comprises: re-arranging words included in the natural language query. Applying the change to the natural language query comprises: breaking the natural language query into two or more sub-queries written in natural language format.

In general, one innovative aspect of the subject matter described in this specification can be embodied in methods that include the actions of obtaining a natural language query from a user; parsing the natural language query into structured operations to be performed on structured application programming interfaces (APIs) of a knowledge base, wherein parsing the natural language query includes: applying one or more domain-specific lexicons to the natural language query, generating one or more parses based on the respective one or more domain-specific lexicons, scoring each of the one or more parses, and generating the structured operations according to a particular parse that satisfies a threshold value; performing the one or more structured operations on the structured APIs of the knowledge base to determine one or more search results; and providing one or more search results responsive to the natural language query to the user.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Applying one or more domain-specific terms includes applying one or more domain-specific lexicons containing one or more previously identified domain-specific terms. Applying one or more domain-specific terms includes receiving one or more domain-specific terms from the user prior to parsing the natural language query. The received one or more domain-specific terms are added to one or more corresponding domain-specific lexicons. Receiving one or more domain-specific terms includes receiving a corresponding domain-specific definition for each domain-specific term. Applying one or more domain-specific lexicons removes a parsing ambiguity generated by a generic parser without applying a domain-specific lexicon.

The subject matter described in this specification can be implemented in particular embodiments so as to realize one or more of the following advantages. The amount of effort used to enhance parsing quality can be reduced. Parsing quality for natural language queries relating to a specific knowledge domain, e.g., high energy physics or archaeology, can be enhanced without retraining using a new domain-specific text corpus, for example, difficult to obtain up-to-date journal publications and conferences papers on high energy physics or archaeology. In some implementations, individual domain-specific terms can be used to form one or more domain-specific lexicons. The domain-specific lexicons can be used to parse a natural language query including domain-specific terms. The domain-specific terms can be learned over time in response to user supplied domain-specific terms, which improves parsing for natural language queries without retraining. In particular, a generic parser can parse natural language queries with domain-specific terms that might otherwise result in a parsing ambiguity. Potential parsing ambiguities can be resolved as they arise through user interactions, eliminating the need to generate results based on each alternative parsing output.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A natural language query processing system can use natural language processing (NLP) techniques to generate, based on natural language queries, structured queries, e.g., SQL queries, operable on an underlying data source and to execute the generated structured queries to obtain query results. One part of the natural language query processing involves using a parser to parse a natural language query into tokens, for example, parsing the query "Where can I get bacon and egg sandwich?" into the following tokens: "Where," "I," "get," "bacon and egg," and "sandwich."

Two types of parsers can be used: a dependency parser and a constituency parser.

A constituency parser breaks a natural language query into phrases and places these phrases in a parsing tree as nodes. The non-terminal nodes in a parsing tree are types of phrases, e.g., Noun Phrase or Verb Phrase; the terminal nodes are the phrases themselves, and the edges are unlabeled.

A dependency parser breaks words in a natural language query according to the relationships between these words. Each node in a parsing tree represents a word, child nodes are words that are dependent on the parent, and edges are labeled by the relationship.

To maintain or increase parsing quality, a parser generally undergoes an initial training and then subsequent retraining, e.g., on an as-needed basis or periodically, with new training data after the initial training. Additionally, to maintain or increase parsing quality of natural language queries relating to a particular knowledge domain, e.g., natural language queries relating to computer database technologies, a parser may need to be trained and retrained with training data, e.g., recent text corpus, from that particular knowledge domain, e.g., up-to-date terminologies in the technical field of computer databases.

However, modifying parsing algorithms to improve parsing quality can be difficult and error-prone. Additionally, training and retraining are iterative processes that can be time- and resource-consuming. Further, training data from a particular knowledge domain may not be available for such training and retraining.

In some implementations, a system can interact with a user before or during a parsing process to maintain or increase a parser's quality. The user interactions can include supplying one or more domain-specific terms or placing span constraints, e.g., phrases or symbols, to a natural language query that has been deemed ambiguous by a parser. Adding a span constraint can clarify, for a parser, relationships between the terms included in a natural language query that a user may have assumed but did not make explicitly clear in the natural language query, and thus remain ambiguous to the parser. When these assumed relationships are clarified, the parser can remove the ambiguities and more accurately parse the natural language query. Terms determined to have domain-specific meanings can be added to a corresponding domain-specific lexicon for use in future parsing of natural language queries including the terms.

Figure 1:
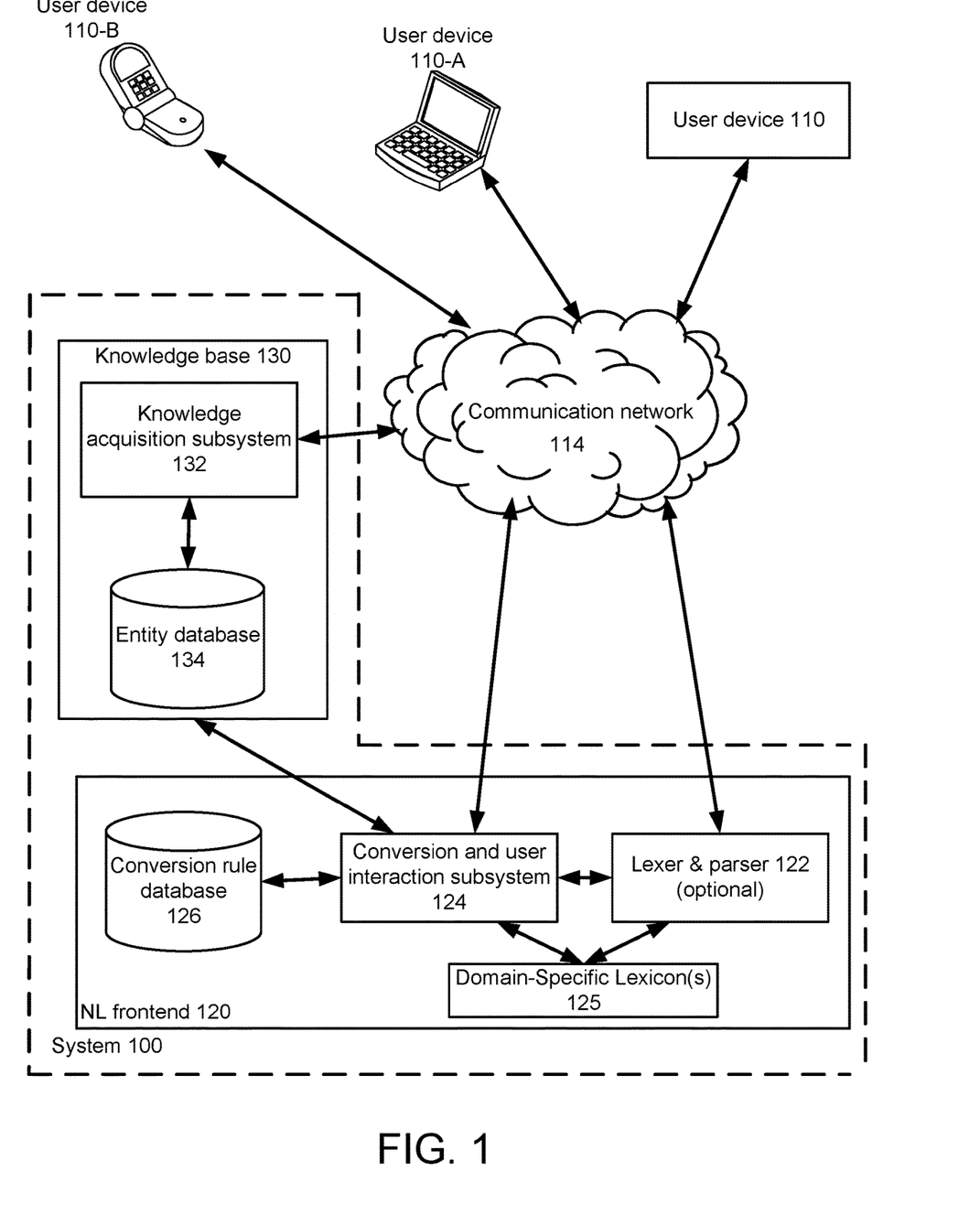
FIG. 1 is a block diagram illustrating an example system for enhancing parsing quality without retraining.

FIG. 1 is a block diagram illustrating an example system 100 for enhancing parsing quality without retraining.

The system 100, which can be implemented on one or more computers located at one or more locations, includes a natural language (NL) front end 120 and a knowledge base 130. The system 100 receives natural language queries originating from one or more user devices 110, e.g., a smart phone 110-B and a laptop 110-A, and converts the received natural language queries into structured operations, e.g., programming statements or structure query language statements, to be performed on application programming interfaces (APIs) of the knowledge base 130. The system 100 obtain search results from executing the structured operations on the APIs of the knowledge base 130 and returns matching search results to user devices for presentation to corresponding users.

The NL frontend 120, which can be implemented on one or more computers located at one or more locations, includes an optional lexer and parser 122, a conversion and user interaction subsystem 124, domain-specific lexicon(s) 125, and a conversion rule database 126. In some implementations, the lexer and parser 122 provided by a system that is independent from, e.g., not part of, the NL frontend 120.

The domain-specific lexicon(s) 125 can be implemented in a number of different ways. A number of separate domain-specific lexicons can be stored in one or more databases. In some implementations, each domain-specific lexicon can be linked to a database table where each of the database tables are organized into schemas. The domain-specific terms can include definitions to form schema lexicons.

The optional lexer and parser 122 processes natural language queries into tokens and further into syntax trees, which are also referred to as parsing trees in this specification, e.g., using a language model. The lexer and parser 622 can also transform, e.g., change the structure of, a parsing tree of a natural language query into another parsing tree with a different structure in accordance with a user modification to the natural language query. In some implementations, the parser 122 uses terms identified in the in one or more domain-specific lexicon to aid in the parsing.

In response to the parser 122 detecting a parsing ambiguity in a natural language query, the conversion and user interaction subsystem 124 interacts with a user, e.g., the user submitting the natural language query, to identify changes that need to be made to the submitted natural language query to resolve the ambiguity.

Additionally, or alternatively, the user interaction through the user interaction subsystem 124 can be used to identify domain-specific terms. For example, a user can add one or more new domain-specific terms. In another example, the user can identify a domain-specific term in response to a parsing result that is incorrect or has an identified ambiguity to resolve. In some implementations, the user can provide a domain-specific definition for the term. The new terms (along with any supplied definitions) are added to the domain-specific lexicon(s) 125.

The conversion and user interaction subsystem 124 converts tokens and parsing trees into structured operations, e.g., SQL statements, executes the structured operations on the APIs of the knowledge base 130, and obtains matching search results from the execution. The conversion and user interaction subsystem 124 performs these conversions based on user interactions, as well as conversion rules specified in the conversion rule database 126.

The conversion rule database 126 stores rules for generating structured operations to be performed on APIs of the knowledge base 130 based on natural language queries. For example, based on (1) the configuration that the knowledge base stores entity information using data tables, and (2) the names of these tables specified in an application schema, a conversion rule may specify that a natural language query, "How much is a non-red Cadillac CTS 2015?" should be converted to a structured query language (SQL) statement "Select MSRP From Table vehicle Where make_and_model='Cadillac CTS' and color='Non-red.'"

Conversion rules stored in the conversion rule database 126 may be specific to a data schema used by the underlying knowledge base. For example, if the underlying knowledge base stores entity information as a graph structure that uses nodes to represent entities and edges to represent relationships between the entities, the conversion rules may specify how a natural language query or update statement is to be parsed to generate statements, e.g., input parameter, operands between these input parameters, and output parameters, for querying the graph structure.

For example, after receiving the natural language query "Who is the first president of the United States?" the system may use conversion rules to generate the following statements: 1. find a node connected with the Node "US president" by a "1st" edge; and 2. retrieve the node's name "George Washington."

The knowledge base 130, which can be implemented on one or more computers at one or more different locations, includes a knowledge acquisition module 132 and an entity database 134. The knowledge base 130 provides structured APIs for use by programs to query and update the entity database 134.

The knowledge acquisition subsystem 132 obtains, from external sources, e.g., the Internet, additional entity information and stores it in association with existing entity information in the entity database 134 and according to the data schema of the knowledge base. The subsystem may communicate directly with external sources, bypassing the NL frontend 120. By obtaining additional entity information from external sources, the subsystem 132 can maintain and update the entity database 134 so that the entity information stored in the database 134 is up-to-date.

The entity database 134 stores entity information, i.e., information about entities, e.g., dates of birth of people, addresses for businesses, and relationships between multiple organizations. The entity information is stored in the entity database 134 according to the data schema. In some implementations, the entity database 134 stores entity information using a table structure. In other implementations, the entity database 134 stores entity information in a graph structure.

A data schema is generally expressed using a formal language supported by a database management system (DBMS) of the entity database. A data schema specifies the organization of entity information as it is logically constructed in the entity database, e.g., dividing entity information into database tables when the entity database is a relational database.

A data schema can include data representing integrity constraints specific to an application, e.g., which columns in a table the application can access and how input parameters should be organized to query a certain table. In a relational database, a data schema may define, for example, tables, fields, relationships, views, indexes, packages, procedures, functions, queues, triggers, types, sequences, materialized views, synonyms, database links, directories, XML schemas, and other elements.

Because entity information in the entity database 134 is stored using one or more particular data schemas, the APIs of the knowledge base 130 are configured to accept structure query operations, e.g., SQL statements, and may not accept natural language queries submitted by users. Therefore, natural language queries submitted by users must be parsed and converted, e.g., using the parser 122 and the subsystem 124, respectively, into structured operations operable on the APIs of the knowledge base 130 to query the entity database 134.

Figure 2:
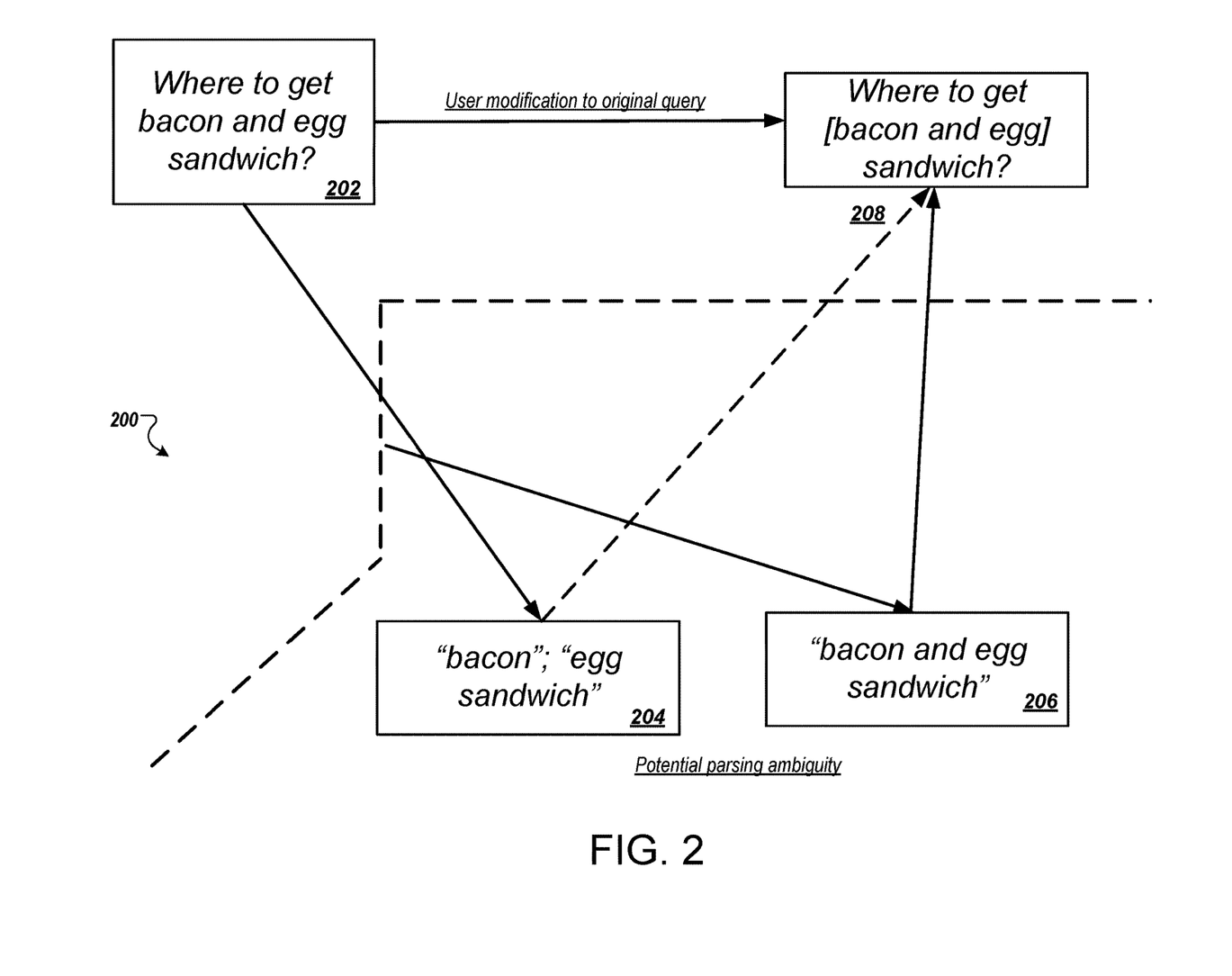
FIG. 2 is a block diagram illustrating an example process for enhancing parsing quality without retraining.

FIG. 2 is a block diagram illustrating an example process 200 for enhancing parsing quality without retraining. For convenience, the process 200 will be described as being performed by a system of one or more computers, located in one or more locations, and programmed appropriately in accordance with this specification. For example, the system 100 of FIG. 1, appropriately programmed, can perform the process 200.

As described in this specification, when executing a natural language query on structured APIs of the knowledge base a natural language processing system needs to parse the natural language query and convert the parsing output into structure operations operable on structured APIs. However, ambiguities may arise when a natural language query is parsed.

For example, as shown in FIG. 2, after obtaining the natural langue query 202 "Where to get bacon and egg sandwich?" a natural language query processing system, e.g., the system 100 shown in FIG. 1, attempts to parse the natural langue query 202 into tokens and further into a parsing tree.

When processing the natural language query 202 "Where can I get bacon and egg sandwich?" a parser, e.g., the lexer and parser 122 of FIG. 1, may notify the system that there are two equally possible, or even plausible, ways 204 and 206 to parse the natural language query 202: either "Where," "can," "I," "get," and "sandwich" that includes both "bacon" and "egg," as shown by the possible partial parsing output 206; or "Where," "can," "I," "get," "bacon," and "egg sandwich," as shown by the possible partial parsing output 204."

When a parsing ambiguity occurs, the natural language query processing system may present information identifying the parsing ambiguity to a user and interact with the user to resolve the ambiguity.

The natural language processing system may request a user to add symbols into the original natural language query to disambiguate. For example, a conversion and user interaction subsystem e.g., the conversion and user interaction subsystem 124 shown in FIG. 1, may prompt a user to add brackets "[ ]" or parenthesis "( )" to the natural language query "Where can I get bacon and egg sandwich?" to disambiguate for the parser.

In response, the user may add brackets around the phrase "bacon and egg" to clarify that the phrase "bacon and egg" describes the word "sandwich." After receiving these user inputs, the conversion and user interaction subsystem may submit the modified natural language query "Where can I get [bacon and egg] sandwich?" to the parser for parsing.

The natural language processing system may also request a user to add words, phrases, or any other text, into the original natural language query to disambiguate. For example, the conversion and user interaction subsystem may prompt the user to add one or more words to the natural language query "Where can I get bacon and egg sandwich?" to disambiguate for the parser.

In response, the user may add the word "a" before the phrase "bacon and egg" to clarify that the entire phrase "bacon and egg" should be deemed as descriptive of the word "sandwich." After receiving these user inputs, the conversion and user interaction subsystem may submit the modified natural language query "Where can I get a bacon and egg sandwich?" to the parser for parsing.

The natural language processing system may additionally request a user to restructure, e.g., rearrange the terms included in, the original natural language query to disambiguate. For example, the conversion and user interaction subsystem may prompt the user to modify the syntax of the natural language query "Where can I get bacon and egg sandwich?" to disambiguate for the parser.

In response, the user may revise the original query into the following revised natural language query "Where can I get a sandwich with both bacon and egg?" to clarify that the phrase "bacon and egg" is descriptive of the word "sandwich." The conversion and user interaction subsystem will then submit the revised query "Where can I get a bacon and egg sandwich?" to the parser for parsing.

The natural language processing system may further request a user to break the original natural language query down into two or more sub-queries to disambiguate. For example, the conversion and user interaction subsystem may ask a user to submit two or more sub-queries "Where can I get bacon and egg sandwich?" to substitute the original natural language query to disambiguate for the parser.

In response, the user may submit sub-queries "Where can I get a sandwich?" and "The sandwich should include bacon and egg." The conversion and user interaction subsystem will then submit these sub-queries as clarification to the original natural language query to the parser for further parsing.

The user input can be used to identify a particular domain-specific term that can be retained in a corresponding domain-specific lexicon for future use in parsing natural language queries. For example, the user insertion of brackets around a particular phrase may be used to indicate a domain-specific term. The user can further provide a domain-specific definition for the term. This can allow a future parsing of a phrase including the term to be parsed without the ambiguity.

Figure 3:
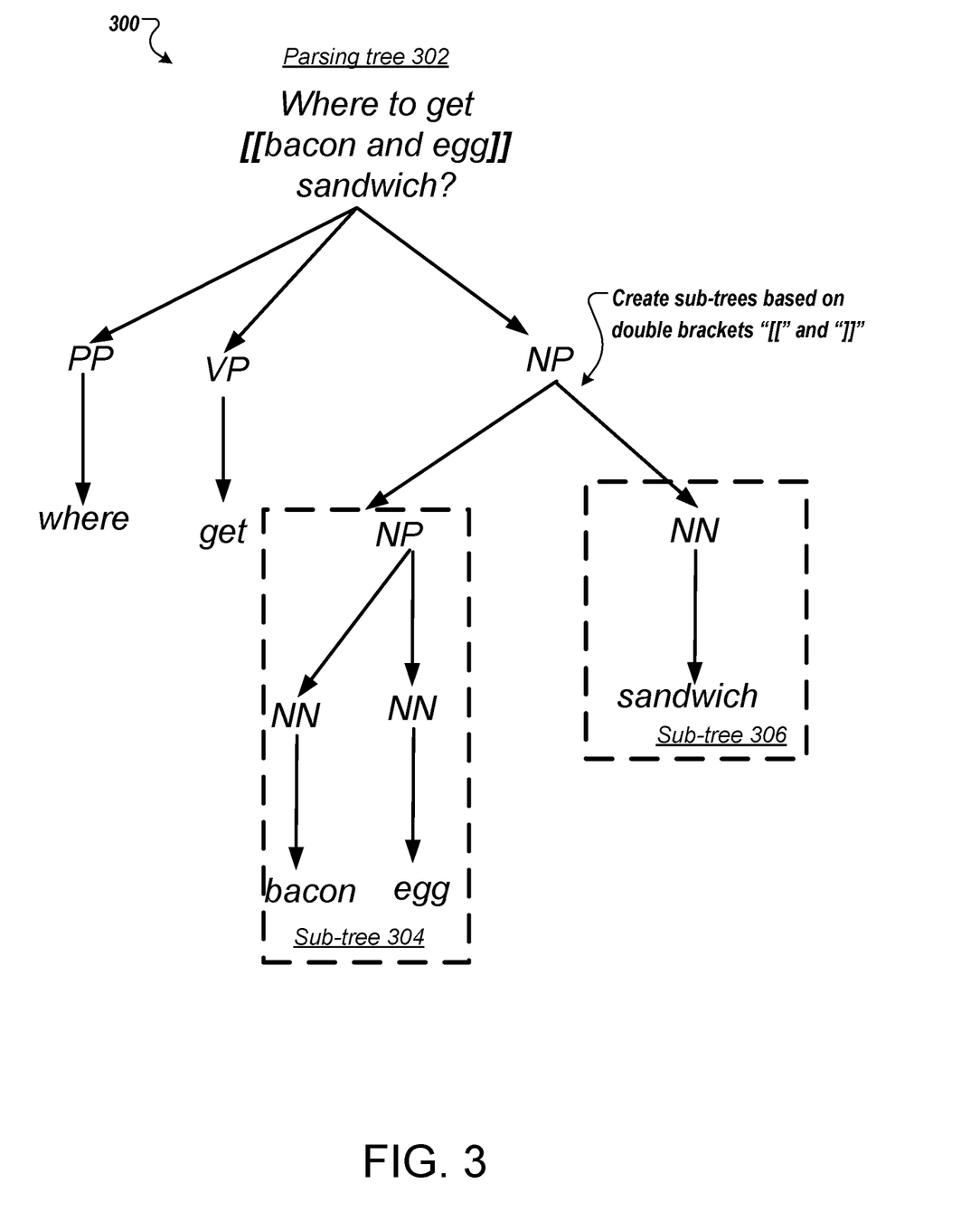
FIG. 3 is a block diagram illustrating an example process for parsing a natural language query in accordance with user interactions.

FIG. 3 is a block diagram illustrating an example process 300 for parsing a natural language query in accordance with user interactions. For convenience, the process 300 will be described as being performed by a natural language query processing system of one or more computers, located in one or more locations, and programmed appropriately in accordance with this specification. For example, the system 100 of FIG. 1, appropriately programmed, can perform the process 300.

In response to detecting a parsing ambiguity, the natural language query processing system may prompt a user for interaction to resolve the ambiguity. In some implementations, after receiving the user interaction, e.g., a user adding one or more span constraints to an ambiguous natural language query, the natural language query processing system can parse the modified natural language query.

After determining that the natural language query "Where to get bacon and egg sandwich?" is ambiguous for parsing purpose, the natural language query processing system requests user interaction.

A user may add a pair of double-brackets to the phrase "bacon and egg" to produce a modified natural language query "Where to get [[bacon and egg]] sandwich?" The double-brackets are added to clarify a semantic relationship that was assumed by the user, but insufficiently conveyed to the parser by the original natural language query. As a result, the parser deemed the natural language query ambiguous, namely that whether the entire phrase "bacon and egg" describes the word "sandwich"; or whether the phrase "bacon and egg" should be deemed as two separate words "bacon" and "egg," and the only word "egg" describes the word "sandwich."

In this example, the user adding the pair of double-brackets to the phrase "bacon and egg" clarifies for the parser that the entire phrase "bacon and egg" should be deemed as descriptive of the word "sandwich."

After receiving the modified natural language query: "Where to get [[bacon and egg]] sandwich?" the natural language query processing system parses the modified natural language query to generate a parsing tree 302.

As shown in the parsing tree 302, based on the user-provided clarification that the entire phrase "bacon and egg" describes the word "sandwich," the phrase "bacon and egg" is parsed into a same sub-tree 304. The sub-tree 304 is a sibling to the sub-tree 306, indicating that the tokens, e.g., "bacon" and "egg," in the sub-tree 304 describe the token, e.g., "sandwich," in the sub-tree 306.

In these example ways, parsing ambiguities can be resolved through user interactions, e.g., introducing span constraints to an otherwise ambiguous natural language query.

Without the use of user-provided span constraints, a parser may have to be retrained, potentially with new training data specific to the same knowledge domain to which an ambiguous natural language query belongs. For example, to resolve an ambiguous natural language query relating to the technical field of computer architecture "how to get ROM and DRAM chips in x86 PC to work?" a natural language query processing system may need to retrain a parser with training data specific to the domain of computer architecture to correctly parse the query. Parser retraining can be a lengthy and resource consuming process because it is performed iteratively. In contrast, using user-provided span constraints during a parsing process does not require retraining and can thus enhance parsing quality with much reduced efforts.

Figure 4:
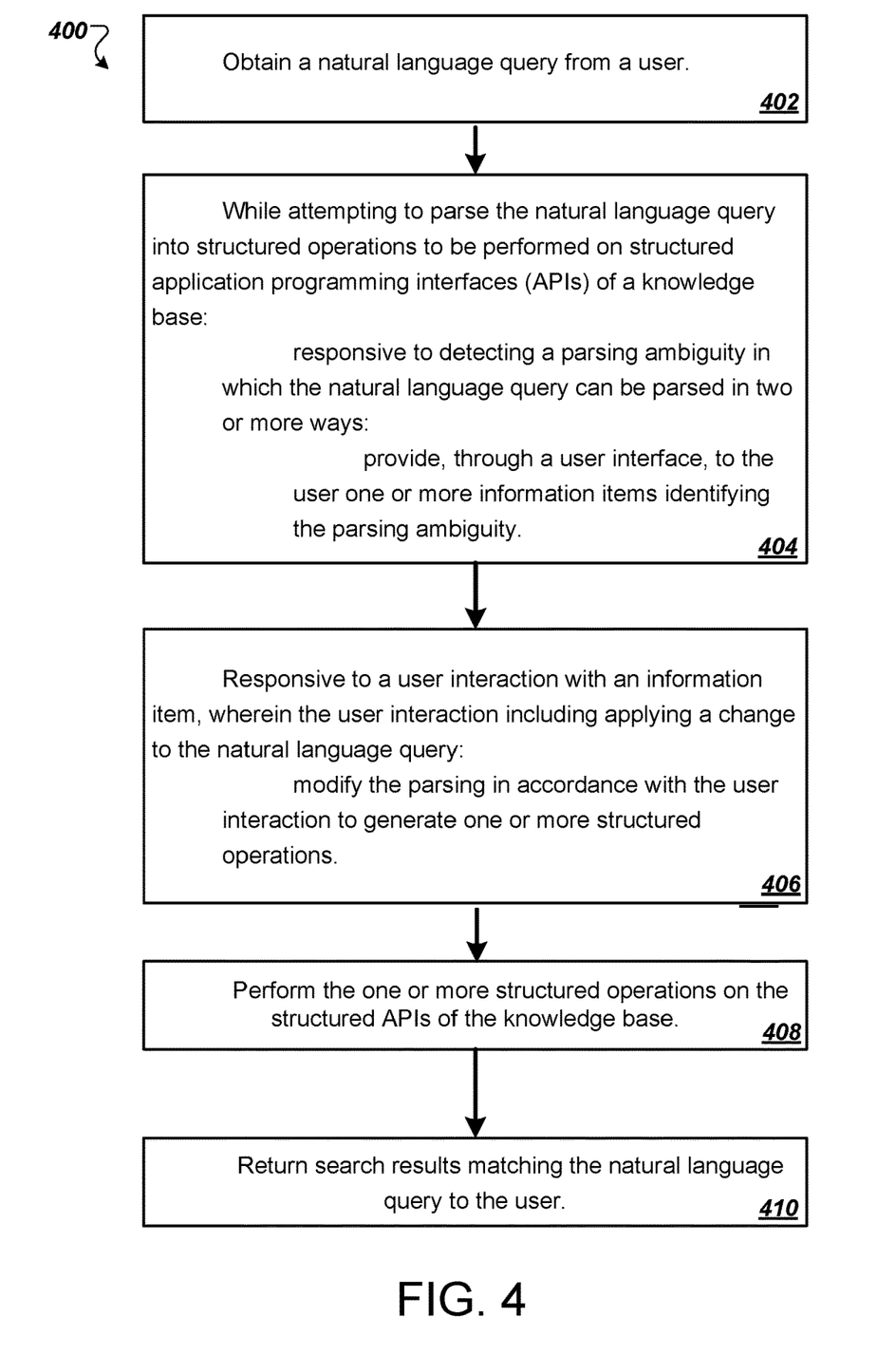
FIG. 4 is a block diagram illustrating an example process for enhancing parsing quality without retraining.

FIG. 4 is a block diagram illustrating an example process 400 for enhancing parsing quality without retraining. For convenience, the process 400 will be described as being performed by a system of one or more computers, located in one or more locations, and programmed appropriately in accordance with this specification. For example, the system 100 of FIG. 1, appropriately programmed, can perform the process 400.

The process 400 begins with the system obtaining, at step 402, a natural language query from a user.

After obtaining the query, the system attempts to convert the query into structured operations to be performed on structured application programming interfaces (APIs) of a knowledge base. For example, the system may parse a plain English query to produce several tokens and map the produced tokens to a data table's schema to generate a SQL query.

Ambiguities, e.g., those described in this specification, may arise when the system attempts to parse the natural language query into tokens to produce one or more structured operations. A parsing ambiguity arises when a parser identifies two or more different ways to parse a natural language query and cannot determine without more information which way was intended by the user when submitting the natural language query.

For example, when processing the natural language query "Where can I get bacon and egg sandwich?" a parser may determine that there are two equally possible, or even plausible, ways to parse the natural language query: either "Where," "can," "I," "get," and "sandwich" that includes both "bacon" and "egg," as shown by the possible parsing output 206; or "Where," "can," "I," "get," "bacon," and "egg sandwich," as shown by the possible parsing output 204."

In some implementations, the parser applies one or more domain-specific lexicons to the natural language query to generate one or more potential parses. Applying a domain-specific lexicon may remove any ambiguity of the parsing. For example, using the applied domain-specific lexicon, a potential parse may be scored such there is no longer any ambiguity and therefore that parse can be used for generating the structured operations, e.g., a parse with a highest score or score satisfying a threshold. In some implementations, two or more parses may have scores sufficient to introduce a parsing ambiguity.

When the system detects a parsing ambiguity, the system provides, at step 404, through a user interface, to the user one or more information items identifying the parsing ambiguity. For example, the natural language query processing system may display two different parsing trees, each representing one of the two possible way in which the natural language query may be parsed.

Responsive to a user interaction with an information item, the system modifies the parsing in accordance with the user interaction to generate one or more structured operations. The user interaction includes applying a change to the natural language query.

In some implementations, applying a change to the natural language query includes adding one or more words to the natural language query. For example, after being notified of the potential parsing ambiguity, the user may add the words "a half pound of" and "an" to the original query and, based on these user interactions, the system produces a modified natural language query "Where can I get a half pound of bacon and an egg sandwich?"

In some implementations, applying a change to the natural language query includes adding one or more symbols to the natural language query. For example, after being notified of the potential parsing ambiguity, the user may add the double brackets ("[[ ]]"), quotation marks (" ") or the like to the original query, and based on these user interactions, the system may produce a modified natural language query "Where can I get 'bacon and egg' sandwich?"

In some implementations, applying a change to the natural language query includes changing syntax of the natural language query. For example, after being notified of the potential parsing ambiguity, the user may add the syntax of the original query, and based on these user interactions, the system may produce a modified natural language query "Where can I get sandwich including: bacon and egg?"

In some implementations, applying syntax of the natural language query includes re-arranging words included in the natural language query. For example, after being notified of the potential parsing ambiguity, the user may re-arrange word or phrases in the original query, and based on these user interactions, the system may produce a modified natural language query "Where can I get sandwich with [[bacon and egg]]?"

In some implementations, applying a change to the natural language query includes breaking the natural language query into two or more sub-queries written in natural language format. For example, after being notified of the potential parsing ambiguity, the user may break the original query into two sub-queries "Where can I get a sandwich?"; and "The sandwich include both bacon and egg." And based on these user interactions, the system may will parse the subqueries to produce structure operations to be performed on the APIs of the knowledge base.

In some implementations, the user input can be used to identify a particular domain-specific term that can be retained in the domain-specific lexicon for future use in parsing natural language queries. For example, for the query "how much revenue is due to click spam?" the parser may parse "click" separately from "spam" resulting in an interpretation of the natural language query that does not treat the phrase "click spam" as a single noun phrase." If the user identifies "click spam" as a domain-specific term, the parser, with this hint, can parse the natural language query in a way that keeps the phrase "click spam" together as a noun when interpreting the query. Using the identified domain-specific term, the parser can re-parse the natural language query, for example, to obtain an interpretation that has resolved the ambiguity. The identified domain-specific meaning for the phrase can be retained for future use by the parser, e.g., in a domain-specific lexicon. Moreover, the parser can apply the domain-specific meaning without retraining the parser's language model using domain-specific training data that includes the phrase.

After interacting with the user to resolve the parsing ambiguity, the system at step 406 parses the modified natural language query into one or more structured operations. For example, the system may produce, from the modified natural language query "Where can I get sandwich including: bacon and egg?" the following SQL statements: SELECT from Table Stores WHERE Service="Sandwich" and Ingredients="Bacon" and "Egg."

After producing the structured operations, the system performs, at step 408, the one or more structured operations, e.g., SQL queries, on the structured APIs of the knowledge base. Once search results matching the structured operations, e.g., matching query results, are determined, the system provides, at step 410, one or more of the search results to the user.

In some implementations, the knowledge base and the user interface are implemented on one or more computers and one or more storage devices storing instructions for executing structured operations on the APIs of the knowledge base. In some implementations, the knowledge base stores information associated with entities according to a data schema and has the APIs for programs to query the knowledge base.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interaction interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining a natural language query from a user;
    parsing the natural language query into structured operations to be performed on structured application programming interfaces (APIs) of a knowledge base, wherein parsing the natural language query includes:
        detecting a parsing ambiguity based on identifying two or more ways to parse the natural language query into one or more structured operations, wherein the parsing ambiguity indicates that the parsing of the natural language query cannot be resolved without receiving, from the user, user input to disambiguate the natural language query;
        responsive to detecting the parsing ambiguity, providing, through a user interface, to the user, one or more information items identifying the parsing ambiguity for display and providing a request for user input identifying a domain-specific term to be used in the parsing of the natural language query to disambiguate the natural language query; and
        responsive to a user interaction with at least one of the one or more information items, wherein the user interaction includes, as the user input to disambiguate the natural language query, the user input identifying the domain-specific term to be used in the parsing of the natural language query, (i) adding the domain-specific term to a domain-specific lexicon and (ii) modifying the parsing to use the domain-specific lexicon including the domain-specific term added in accordance with the user interaction to generate one or more structured operations;
    performing the one or more structured operations on the structured APIs of the knowledge base to determine one or more search results; and
    providing the one or more search results responsive to the natural language query to the user,
    wherein:
        the knowledge base and the user interface are implemented on one or more computers and one or more storage devices storing instructions;
        the knowledge base stores information associated with entities according to a data schema and includes the structured APIs for programs to query the knowledge base;
        the domain-specific term is retained in the domain-specific lexicon; and
        the domain-specific lexicon in which the domain-specific term is retained is used in parsing a subsequent natural language query.

2. The method of claim 1, wherein the user input to disambiguate the natural language query further includes a domain-specific definition for the domain-specific term.

3. The method of claim 1, wherein the user input to disambiguate the natural language query further includes additional information applying a change to the natural language query.

4. The method of claim 3, wherein the additional information applying the change to the natural language query comprises adding one or more symbols to the natural language query.

5. The method of claim 3, wherein the additional information applying the change to the natural language query comprises changing syntax of the natural language query, comprising rearranging words included in the natural language query.

6. The method of claim 3, wherein the additional information applying the change to the natural language query comprises breaking the natural language query into two or more sub-queries written in natural language format.

7. The method of claim 3, wherein the additional information applying the change to the natural language query comprises adding one or more words to the natural language query.

8. A computing system comprising:
    one or more computers; and
    one or more storage units storing instructions that when executed by the one or more computers cause the computing system to perform operations comprising:
        obtaining a natural language query from a user;
        parsing the natural language query into structured operations to be performed on structured application programming interfaces (APIs) of a knowledge base, wherein parsing the natural language query includes:
            detecting a parsing ambiguity based on identifying two or more ways to parse the natural language query into one or more structured operations, wherein the parsing ambiguity indicates that the parsing of the natural language query cannot be resolved without receiving, from the user, user input to disambiguate the natural language query;
            responsive to detecting the parsing ambiguity, providing, through a user interface, to the user, one or more information items identifying the parsing ambiguity for display and providing a request for user input identifying a domain-specific term to be used in the parsing of the natural language query to disambiguate the natural language query; and
            responsive to a user interaction with at least one of the one or more information items, wherein the user interaction includes, as the user input to disambiguate the natural language query, the user input identifying the domain-specific term to be used in the parsing of the natural language query, (i) adding the domain-specific term to a domain-specific lexicon and (ii) modifying the parsing to use the domain-specific lexicon including the domain-specific term added in accordance with the user interaction to generate one or more structured operations;

performing the one or more structured operations on the structured APIs of the knowledge base to determine one or more search results; and providing the one or more search results responsive to the natural language query to the user, wherein:

the knowledge base and the user interface are implemented on one or more computers and one or more storage devices storing instructions;

the knowledge base stores information associated with entities according to a data schema and includes the structured APIs for programs to query the knowledge base;

the domain-specific term is retained in the domain-specific lexicon; and the domain-specific lexicon in which the domain-specific term is retained is used in parsing a subsequent natural language query.

9. The computing system of claim 8, wherein the user input to disambiguate the natural language query further includes a domain-specific definition for the domain-specific term.

10. The computing system of claim 8, wherein the user input to disambiguate the natural language query further includes additional information applying a change to the natural language query.

11. The computing system of claim 10, wherein the additional information applying the change to the natural language query comprises adding one or more symbols to the natural language query.

12. The computing system of claim 10, wherein the additional information applying the change to the natural language query comprises changing syntax of the natural language query, comprising rearranging words included in the natural language query.

13. One or more non-transitory computer-readable storage media encoded with instructions that, when executed by one or more computers, cause the one or more computers to perform operations comprising:

obtaining a natural language query from a user;

parsing the natural language query into structured operations to be performed on structured application programming interfaces (APIs) of a knowledge base, wherein parsing the natural language query includes:

detecting a parsing ambiguity based on identifying two or more ways to parse the natural language query into one or more structured operations, wherein the parsing ambiguity indicates that the parsing of the natural language query cannot be resolved without receiving, from the user, user input to disambiguate the natural language query;

responsive to detecting the parsing ambiguity, providing, through a user interface, to the user, one or more information items identifying the parsing ambiguity for display and providing a request for user input identifying a domain-specific term to be used in the parsing of the natural language query to disambiguate the natural language query; and responsive to a user interaction with at least one of the one or more information items, wherein the user interaction includes, as the user input to disambiguate the natural language query, the user input identifying the domain-specific term to be used in the parsing of the natural language query, (i) adding the domain-specific term to a domain-specific lexicon and (ii) modifying the parsing to use the domain-specific lexicon including the domain-specific term added in accordance with the user interaction to generate one or more structured operations;

performing the one or more structured operations on the structured APIs of the knowledge base to determine one or more search results; and providing the one or more search results responsive to the natural language query to the user, wherein:

the knowledge base and the user interface are implemented on one or more computers and one or more storage devices storing instructions;

the knowledge base stores information associated with entities according to a data schema and includes the structured APIs for programs to query the knowledge base;

the domain-specific term is retained in the domain-specific lexicon; and the domain-specific lexicon in which the domain-specific term is retained is used in parsing a subsequent natural language query.

14. The one or more non-transitory computer-readable storage media of claim 13, wherein the user input to disambiguate the natural language query further includes a domain-specific definition for the domain-specific term.

\* \* \* \* \*